(12) United States Patent
Kennedy et al.

(10) Patent No.: US 11,555,291 B2
(45) Date of Patent: Jan. 17, 2023

(54) SELF-PROPELLED WORK VEHICLE AND METHOD IMPLEMENTING PERCEPTION INPUTS FOR COOLING FAN CONTROL OPERATIONS

(71) Applicant: Deere & Company, Moline, IL (US)

(72) Inventors: Thomas L. Kennedy, Dubuque, IA (US); Craig A. Conrad, Dubuque, IA (US)

(73) Assignee: Deere & Company, Moline, IL (US)

( * ) Notice: Subject to any disclaimer, the term of this patent is extended or adjusted under 35 U.S.C. 154(b) by 355 days.

(21) Appl. No.: 16/841,191

(22) Filed: Apr. 6, 2020

(65) Prior Publication Data

US 2021/0310215 A1    Oct. 7, 2021

(51) Int. Cl.
| | | |
|---|---|---|
| *E02F 9/00* | (2006.01) |
| *E02F 9/20* | (2006.01) |
| *B60K 11/06* | (2006.01) |
| *E02F 9/08* | (2006.01) |
| *E02F 9/26* | (2006.01) |

(52) U.S. Cl.
CPC ............ *E02F 9/2095* (2013.01); *B60K 11/06* (2013.01); *E02F 9/0866* (2013.01); *E02F 9/26* (2013.01)

(58) Field of Classification Search
CPC ......... E02F 9/2095; E02F 9/0866; E02F 9/26; B60K 11/06
See application file for complete search history.

(56) References Cited

U.S. PATENT DOCUMENTS 4,233,040 A * 11/1980 Vogelaar ................. A01D 41/12
 55/467
4,886,532 A * 12/1989 Zimmerman ........... F24F 7/065
 55/302

(Continued)

FOREIGN PATENT DOCUMENTS

| EP | 3425211 A1 | 1/2019 |
|---|---|---|
| WO | WO0220955 A1 | 3/2002 |
| WO | 2012135825 A1 | 10/2012 |

OTHER PUBLICATIONS

Extended European Search Report and Written Opinion issued in European Patent Application No. 21216071.7, dated Mar. 9, 2022, in 07 pages.

(Continued)

*Primary Examiner* — Hau V Phan
(74) *Attorney, Agent, or Firm* — Gary L. Montle; Lucian Wayne Beavers; Patterson Intellectual Property Law, PC (57) ABSTRACT

Systems and methods are disclosed herein for controlling cooling fans in a self-propelled work vehicle having a main frame supported by wheels or tracks. The cooling fans direct ambient air in accordance with at least one inlet in the main frame, and selectively operate in first and second opposing directions. A perception system is supported by the main frame and configured to provide perception data (e.g., perception data) corresponding to a field of vision which includes the at least one inlet and at least a portion of an associated working area. A controller obtains the perception data and automatically determines characteristics relating to contamination of the cooling system based at least On the perception data. The controller further generates output signals to the cooling fans based on at least one of the determined contaminant characteristics, for example a debris location, type, density, and/or quantity as relating to contamination of the cooling system.

20 Claims, 4 Drawing Sheets

(56) References Cited

U.S. PATENT DOCUMENTS

| | | | |
|---|---|---|---|
| 6,029,430 A * | 2/2000 | Isfort | A01F 12/54 |
| | | | 56/13.3 |
| 6,321,830 B1 * | 11/2001 | Steinmann | F28F 19/00 |
| | | | 165/145 |
| 6,750,623 B1 | 6/2004 | McCauley et al. | |
| 7,431,073 B2 * | 10/2008 | Radke | F01P 11/12 |
| | | | 165/122 |
| 7,856,951 B2 | 12/2010 | Kamado et al. | |
| 7,878,171 B2 * | 2/2011 | Vandike | F02M 35/164 |
| | | | 165/95 |
| 7,953,520 B2 | 5/2011 | Hayashi | |
| 7,997,238 B2 * | 8/2011 | D'hondt | F01P 11/12 |
| | | | 123/41.31 |
| 8,714,116 B2 | 5/2014 | Hartman et al. | |
| 8,967,092 B1 * | 3/2015 | Jones | F04D 27/00 |
| | | | 123/41.12 |
| 8,997,906 B2 * | 4/2015 | Schertz | B60H 1/00378 |
| | | | 700/275 |
| 9,586,473 B2 | 3/2017 | Pfohl et al. | |
| 9,605,583 B2 | 3/2017 | Goering et al. | |
| 10,479,191 B2 | 11/2019 | Ivey et al. | |
| 2006/0062678 A1 | 3/2006 | Furuta et al. | |
| 2006/0185626 A1 | 8/2006 | Allen et al. | |
| 2013/0319778 A1 | 12/2013 | MacGregor et al. | |
| 2014/0151139 A1 * | 6/2014 | Rizzon | B60K 11/08 |
| | | | 180/68.1 |
| 2014/0311140 A1 * | 10/2014 | Hyodo | F16H 61/4165 |
| | | | 60/489 |
| 2016/0319517 A1 | 11/2016 | Nackers | |
| 2017/0096931 A1 * | 4/2017 | Beichner | F01P 11/12 |
| 2017/0342988 A1 | 11/2017 | Marcant | |
| 2018/0252314 A1 * | 9/2018 | Hyodo | F01P 5/04 |
| 2018/0264932 A1 * | 9/2018 | Okugawa | B60K 11/04 |

OTHER PUBLICATIONS

Extended European Search Report and Written Opinion issued in European Patent Application No. 21159407.2, dated Sep. 13, 2021, in 08 pages.

* cited by examiner

SELF-PROPELLED WORK VEHICLE AND METHOD IMPLEMENTING PERCEPTION INPUTS FOR COOLING FAN CONTROL OPERATIONS

FIELD OF THE DISCLOSURE

The present disclosure relates generally to self-propelled vehicles such as working machines in the construction and/or agricultural industries which include one or more cooling system fans. More particularly, the present disclosure relates to systems and methods implementing machine perception inputs the regulating operation of the cooling system fans based on identified and/or potential contamination of the cooling system.

BACKGROUND

Work vehicles as discussed herein may for example include excavator machines, forestry swing machines, skid steer loaders, compact track loaders, and other equipment which modify the terrain or equivalent working environment in some way. These machines may typically have tracked or heeled ground engaging units supporting the undercarriage from the ground surface, and may further include one or more working implements which are used to modify the terrain, independently or in coordination with movement of the machine.

There is an ongoing need in the field of such work vehicles for solutions that provide better operational awareness for the operator. Many forms of construction and agriculture vehicles have cameras (mono or stereo) mounted to the rear of the vehicle to aid the operator or the machine in perceiving what objects may be in the vicinity of the vehicle. In some circumstances, these cameras are located where the inlet to a cooling system is directly within view of the camera. These systems can help an operator to see what is around the vehicle but are only functional when the operator is looking at the monitor.

The cooling systems in work vehicles will eventually become ingested with debris or other contaminants which are collected during operation and accumulate over time. In conventional examples, the contaminants are removed by manually initiating reversal of the direction of operation for the cooling fan(s), and therefore the direction of airflow in the cooling system. This manual actuation may occur upon recognition by the operator that such cleaning is required, or example at predetermined intervals in time.

BRIEF SUMMARY

The current disclosure provides an enhancement to conventional systems, at least in part by introducing context to whether or not the cooling system requires (or will require) fan reversal operation. An intelligent control system may be implemented to collect data that is specific to the work area of the work vehicle, and/or data specific to the actual operating parameters of the vehicle, and further to generate data-driven alerts to the operator or even dynamically and automatically control cooling fan operation based on the detected and/or predicted ingestion conditions.

In an embodiment as disclosed herein, a self-propelled work vehicle is provided a main frame supported by a plurality of ground engaging units (e.g., wheels or tracks). A cooling system supported by the main frame directs ambient air in accordance with at least one inlet in the main frame, and comprises at least one cooling fan configured to operate in a first direction and an opposing second direction. A perception system (e.g., an array of cameras) supported by the main frame provides perception data (e.g., images) corresponding to a field of vision which includes one or more of the at least one inlet and at least a portion of an associated working area. A controller is communicatively linked to the perception system and the cooling system, and configured to automatically determine one or more characteristics relating to contamination of the cooling system, based at least on the provided perception data, and to generate output signals to one or more of the at least one cooling fan based on at least one of the determined one or more contaminant characteristics.

In one exemplary aspect of the above-referenced embodiment, the controller may be configured to identify debris in the working area from the provided perception data, and to automatically determine the one or more characteristics relating to contamination of the cooling system based at least on classification of the identified debris.

The one or more characteristics relating to contamination of the cooling system may for example comprise one or more of: debris location; debris type; and debris density.

In another exemplary aspect of the above-referenced embodiment, the controller may be further configured to determine a type of working area from the provided perception data, and to classify the identified debris based at least in part o the type of working area.

In another exemplary aspect of the above-referenced embodiment, the controller may be further configured to determine a type of working area from the provided perception data, and to identify the debris in the working area based at least in part the type of working area.

In another exemplary aspect of the above-referenced embodiment, the controller may be configured to generate the output signals based on a comparison of the at least one of the determined one or more contaminant characteristics to an associated contaminant threshold.

An ingested amount of debris may for example be predicted as a contaminant characteristic.

In addition, or in the alternative, the controller may obtain one or more vehicle drive parameters, and be further configured to implement based at least in part thereon a rainwater cycle counting algorithm to determine an ingested amount of debris as a contaminant characteristic.

The controller may be still further configured to obtain an ambient temperature, and to further implement the ambient temperature in the rainwater cycle counting algorithm to determine an ingested amount of debris as a contaminant characteristic.

In another exemplary aspect of the above-referenced embodiment, the one or more output signals are generated to dynamically modify a maximum operating speed for the one or more of the at least one cooling fan based on at least one of the determined one or more contaminant characteristics.

In another exemplary aspect of the above-referenced embodiment, the one or more output signals are generated to dynamically modify a fan direction for the one or more of the at least one cooling fan based on at least one of the determined one or more contaminant characteristics.

In another exemplary aspect of the above-referenced embodiment, the one or more output signals are generated to dynamically modify a frequency of fan direction reversal for the one or more of the at least one cooling fan based on at least one of the determined one or more contaminant characteristics.

In another exemplary aspect of the above-referenced embodiment, the one or more output signals are generated to dynamically modify a duration of fan direction reversal for the one or more of the at least one cooling fan based on at least one of the determined one or more contaminant characteristics.

In another exemplary aspect of the above-referenced embodiment, the controller may automatically determine that at least one of the one or more characteristics relating to contamination of the cooling system exceed a removal capability of the cooling system, and generate output signals to a user interface for alerting or scheduling manual intervention with respect to the cooling system.

An embodiment of a method is also disclosed herein for controlling at least one cooling fan to direct ambient air in accordance with at least one inlet in a main frame of a self-propelled work vehicle, each of the at least one cooling fan operable in a first direction and an opposing second direction. The method comprises obtaining perception data from a perception system supported by the main frame, the perception data corresponding to a field of vision which includes one or more of the at least one inlet and at least a portion of an associated working area. One or more characteristics relating to contamination of the cooling system are automatically determined, based at least on the provided perception data. Output signals are generated to one or more of the at least one cooling fan based on at least one of the determined one or more co ant characteristics.

In an exemplary aspect of the above-referenced method, the step of automatically determining one or more characteristics relating to contamination of the cooling system comprises identifying debris in the working area from the provided perception data, and automatically determining the one or more characteristics relating to contamination of the cooling system based at least on classification of the identified debris, wherein the one or more characteristics relating to contamination of the cooling system comprise one or more of: debris location; debris type; and debris density.

In another exemplary aspect of the above-referenced method, a type of working area is determined from the provided perception data and, based at least in part on the determined type of working area, the method further comprises identifying the debris in the working area and/or classifying the identified debris.

In another exemplary aspect of the above-referenced method, the output signals are generated based on a comparison of the at least one of the determined one or more contaminant characteristics to an associated contaminant threshold.

In another exemplary aspect of the above-referenced method, one or more vehicle drive parameters are obtained, and the method further comprises implementing, based at least in part thereon, a rainwater cycle counting algorithm to determine an ingested amount of debris as a contaminant characteristic.

In another exemplary aspect of the above-referenced method, the one or more output signals are generated to dynamically modify one or more of: a maximum operating speed for the one or more of the at least one cooling fan based on at least one of the determined one or more contaminant characteristics; a fan direction for the one or more of the at least one cooling fan based on at least one of the determined one or more contaminant characteristics; a frequency of fan direction reversal for the one or more of the at least one cooling fan based on at least one of the determined one or more contaminant characteristics; and a duration of fan direction reversal for the one or more of the at least one cooling fan based on at least one of the determined one or more contaminant characteristics.

Numerous objects, features and advantages of the embodiments set forth herein will be readily apparent to those skilled in the art upon reading of the following disclosure when taken in conjunction with the accompanying drawings.

DETAILED DESCRIPTION

Figure 1A:
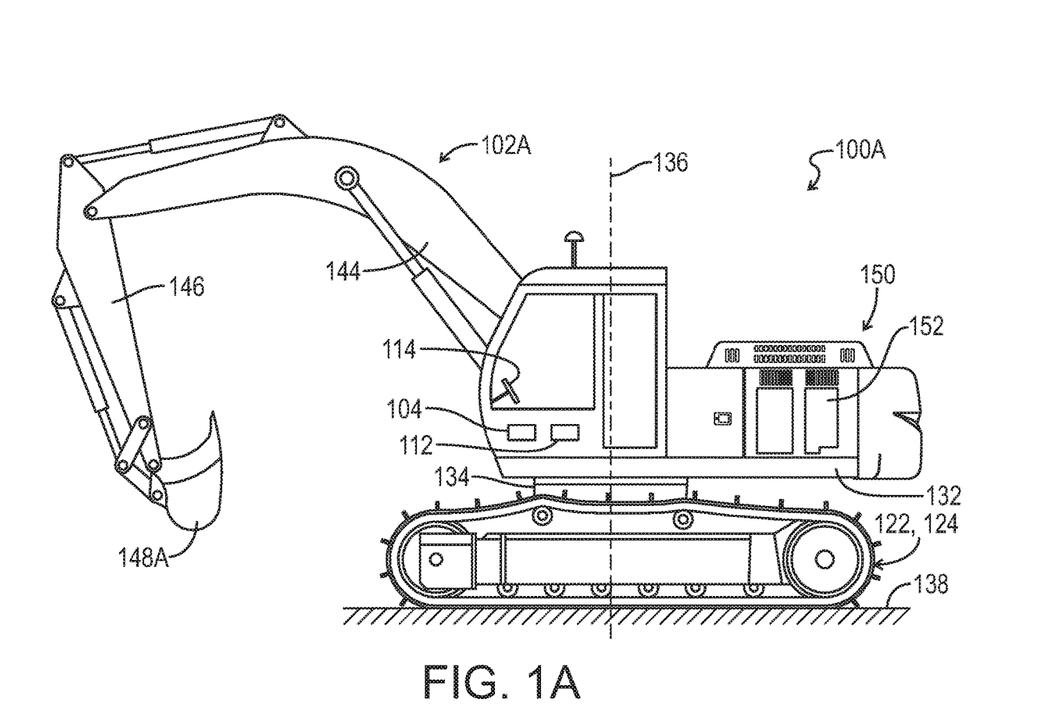
FIG. 1A is a side elevation view of a tracked work vehicle incorporating an embodiment of a system and method as disclosed herein.
Figure 1B:
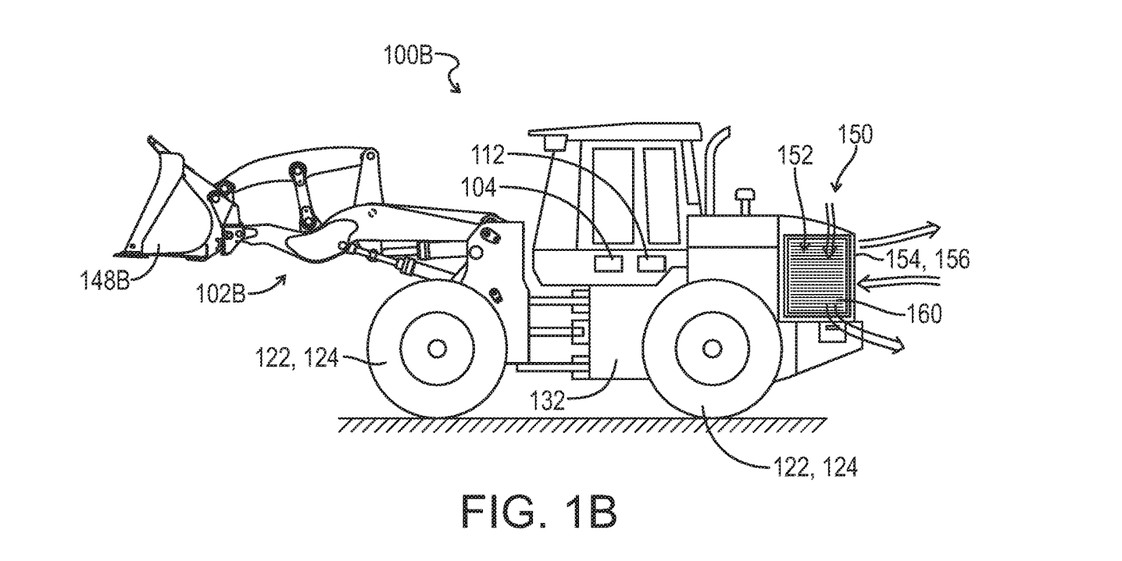
FIG. 1B is a side elevation view of a wheeled work vehicle incorporating an embodiment of a system and method as disclosed herein.
Figure 1C:
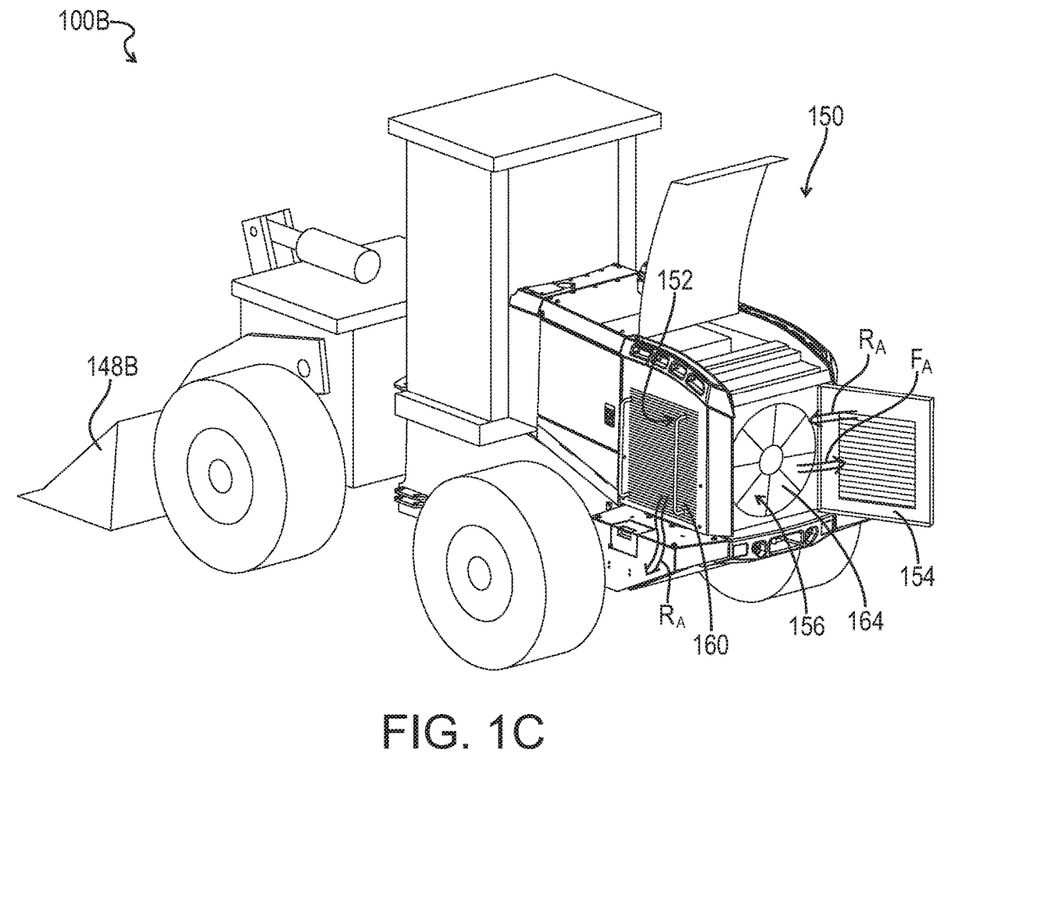
FIG. 1C is an isometric view of the work vehicle of FIG. 1B, with the cooling system further illustrated.
Figure 2:
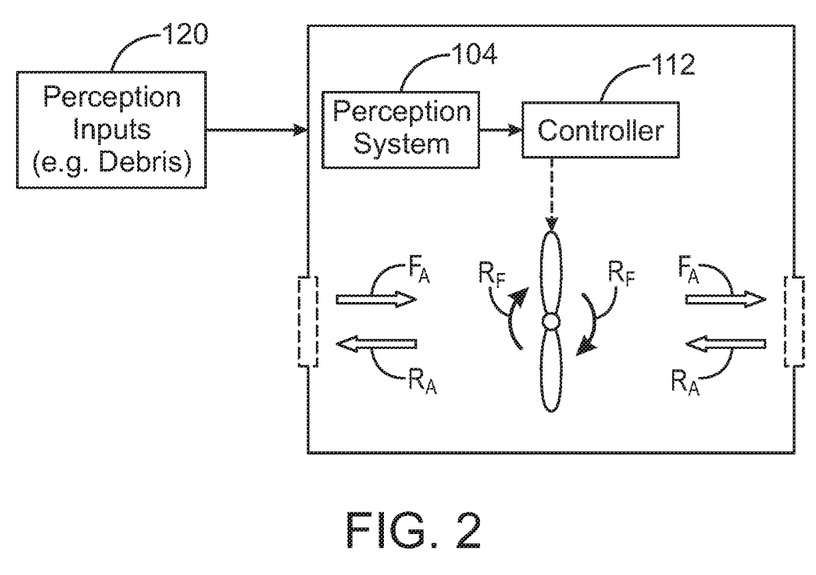
FIG. 2 is a block diagram representing an exemplary cooling control system for the work vehicles of FIGS. 1A-1C.
Figure 3:
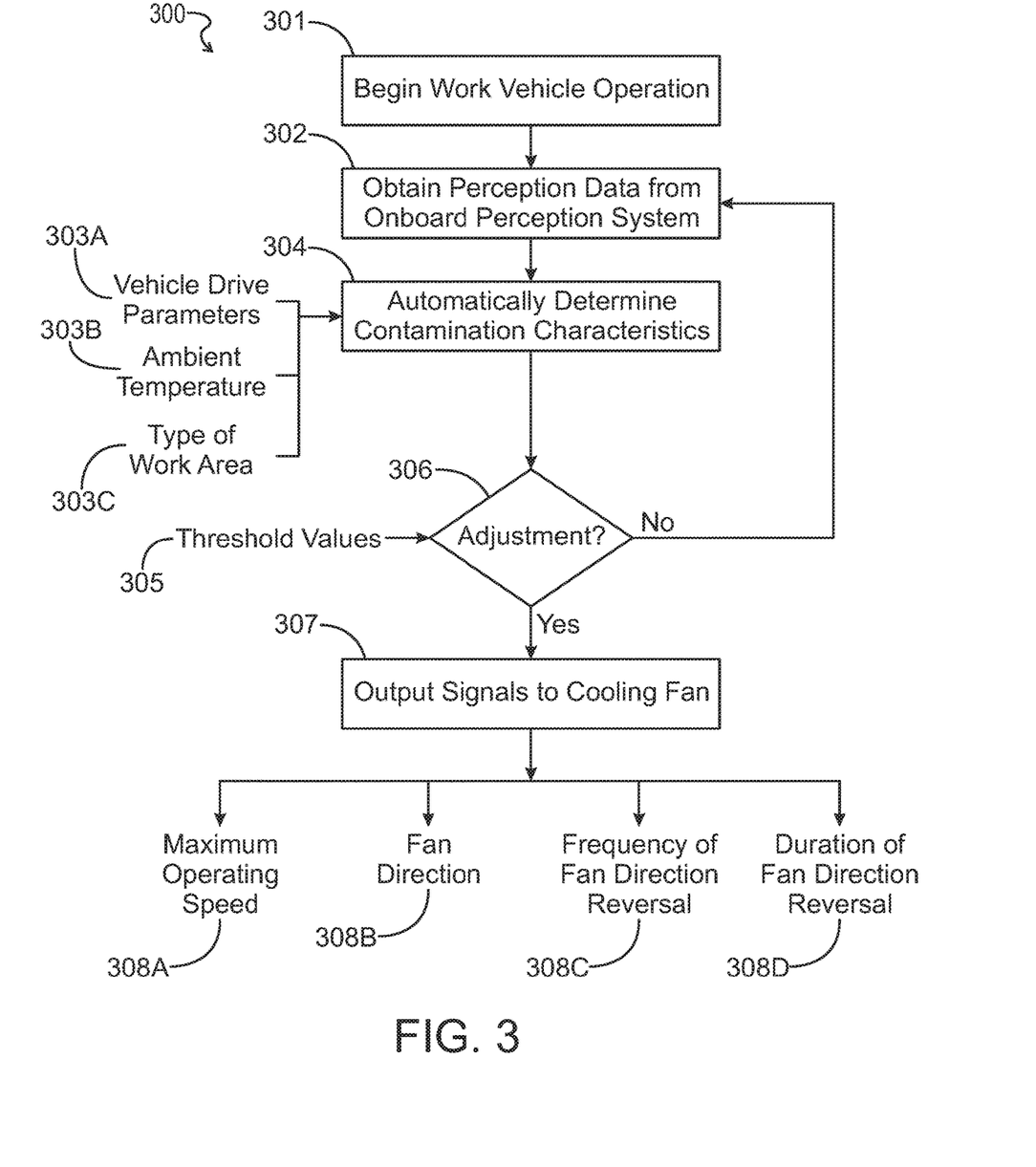
FIG. 3 is a flowchart representing an exemplary embodiment of a method as disclosed herein.

Referring now to FIGS. 1-3, various embodiments of a work vehicle 100 may be described which include perception system 104 components for intelligent cooling fan logic. In one example, camera images of perception inputs 120 such as debris (or equivalent contaminants which may collectively be referred to herein as "debris") may be provided or otherwise processed in conjunction with a controller 112 implementing machine learning algorithms or the like to identify certain characteristics of the working environment. The controller may typically be capable of identifying and classifying the debris or equivalent contaminant that is located near an inlet 152 to the cooling system 150, either in the air or on the ground. The location of the debris, debris type, debris density and other information regarding the debris may be used as an input for fan speed and reversal logic.

For environments where a work vehicle 100 only periodically encounters debris 120 that is easily ingested into a cooling system 150, the fan logic may for example reduce maximum fan speed in that area to keep from obstructing the heat exchangers. The fan reversal logic could also be altered such that reversals occur more frequently to clean out coolers, or the time period in between fan reversals could be prolonged in order to improve the durability of the system. The controller 112 (e.g., implementing a machine learning algorithm) could use a rain flow cycle counting method to determine the amount of debris that has been ingested into the cooling system and then, based on the debris type, size, and quantity, the work vehicle control system may dynamically and automatically initiate its fan reversal routine for cooling system cleanout. As previously noted, the system algorithms may in the alternative or further determine the point at which manual cleanout by the operator would be required.

FIG. 1A shows a representative work vehicle in the context of a tracked excavator machine 100A having a front-mounted working implement 102 for modifying the proximate terrain. In certain embodiments, however, systems and methods as disclosed herein may also be applicable to vehicles lacking explicit work implements. A work vehicle 100 as disclosed herein may also be in the form of a loader 100B as shown in FIG. 1B. It is within the scope of the present disclosure that the work vehicle 100 may be in the form of any other vehicle which includes a cooling system 150, particularly a work vehicle designed for use in off-highway environments such as a bulldozer, a motor grader, or another construction, agricultural, or utility vehicle, for example.

Except as otherwise noted herein, reference numbers used to refer to components of vehicle 100A are correspondingly used in reference to wheel drive vehicle 100B, except with "B" replacing the "A" identifier. In addition, vehicles 100A and 100B and their associated structures may be referred to generically as their numeric identifier only, e.g., "100" may be used herein to refer to either of vehicles 100A, 100B.

The illustrated and exemplary tracked excavator machine 100A includes an undercarriage including a left-side tracked ground engaging unit 122 and a right-side tracked ground engaging unit 124, and at least one travel motor (not shown) for driving the respective ground engaging units. Each of the tracked ground engaging units 122, 124 may typically include a front idler, a drive sprocket, and a track chain extending around the front idler and the drive sprocket. The travel motor of each tracked ground engaging unit 122, 124 drives its respective drive sprocket. Each tracked ground engaging unit 122, 124 has a forward traveling direction defined from the drive sprocket toward the front idler. The forward traveling direction of the tracked ground engaging units 122, 124 also defines a forward traveling direction of the undercarriage and thus of the working machine 100.

A main frame 132 is supported by the undercarriage via a swing bearing 134 such that the main frame 132 is pivotable about a pivot axis 136 relative to the undercarriage. The pivot axis 136 is substantially vertical when a ground surface 138 engaged by the ground engaging units 122, 124 is substantially horizontal. A swing motor (not shown) is configured to pivot the main frame 132 on the swing bearing 134 about the pivot axis 136 relative to the undercarriage.

A work vehicle such as the tracked excavator machine 100A as shown in FIG. 1A typically includes one or more working implements which may collectively define a boom assembly 102A including a boom 144, an arm 146 pivotally connected to the boom 144, and a working tool 148A. The boom 144 in the present example is pivotally attached to the main frame 132 to pivot about a generally horizontal axis relative to the main frame 132. The working tool in this embodiment is an excavator shovel or bucket 148A which is pivotally connected to the arm 146. The boom assembly 102A extends from the main frame 132 along a working direction of the boom assembly. The working direction can also be described as a working direction of the boom 144.

An operator's cab may be located on the main frame 132. The operator's cab and the one or more working implements 102A may both be mounted on the main frame so that the operator's cab faces in the working direction of the working implements. A control station including a user interface 114 may be located in the operator's cab.

The terns "user interface" 114 as used herein may broadly take the form of a display unit and/or other outputs from the system such as indicator lights, audible alerts, and the like. The user interface may further or alternatively include various controls or user inputs (e.g., a steering wheel, joysticks, levers, buttons) for operating the work vehicle 100, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface (not shown) may take the form of a display that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

Referring to FIG. 1B, the illustrated work vehicle 100 is a loader 100B and the relevant working tool 148 is a front-mounted loader bucket 14B. As with the excavator bucket 148A in FIG. 1A, the loader bucket 148B faces generally away from the operator of the loader 100B, and is moveably coupled to the main frame 132 via a boom assembly 102B for forward-scooping, carrying, and dumping dirt and other materials. Other suitable work tools within the scope of the present disclosure inlay include, for example, blades, forks, tillers, and mowers.

In each of FIGS. 1A-1C, ambient cooling air may enter the main frame 132 via an inlet 152 formed in a side wall of the main frame. The inlet may be at least partially covered with a protective barrier 160 such as a screen or grille which may be moveably coupled to the main frame to allow operator access to interior components of the cooling system 150, such as for example a cooling fan 164. The ambient cooling air may be provided to cool, e.g., hydraulic fluid and engine coolant via respective cooling system components, and may further continue to travel through the main frame 132 in a forward air direction $F_A$ and into an engine compartment to facilitate direct air cooling of the engine.

For the exemplary loader 100B as illustrated in FIGS. 1B and 1C, the rear panel 154 may be opened to enable access to the cooling fan 164, or alternatively may include the cooling fan and be pivoted closed into an operating position, wherein the cooling fan can be implemented to draw ambient air through the side walls, across or further through other internal system components, and subsequently exhausted to the aft of the work vehicle.

When the work vehicle 100 is in operation, protective barriers 160 such as filter screens or grilles may be implemented in a closed position of FIG. 1B to form a barrier against the flow of particulate matter and airborne debris 120 from the ambient air to the internal components of the cooling system 150. Accumulated contaminants trapped in the protective barriers may be selectively discharged by reversing the direction of the cooling fan 164. In the reverse mode, the controller 112 causes the cooling fan 164 to be rotated in a reverse fan direction $R_F$ as shown (which is opposite a forward fan direction $F_F$) to exhaust air from the interior 156 to exit the main frame 132 in the reverse air direction $R_A$, thereby clearing away accumulated dirt and debris collected on and near the inlets 152 during the forward mode of operation.

As schematically illustrated in FIG. 2, the working machine 100 includes a control system including a controller 112. The controller may be part of the machine control system of the working machine, or it may be a separate control module. Accordingly, the controller may generate control signals for controlling the operation of various actuators throughout the work vehicle 100, which may for example be hydraulic motors, hydraulic piston-cylinder units, electric actuators, or the like. Electronic control signals from the controller may for example be received by electro-hydraulic control valves associated with respective actuators, wherein the electro-hydraulic control valves control the flow of hydraulic fluid to and from the respective hydraulic actuators to control the actuation thereof in response to the control signal from the controller.

The controller 112 may include or be functionally linked to the user interface 114 and optionally be mounted in the operators cab at a control panel 114.

The controller 112 is configured to receive input signals from some or all of various sensors associated with the work vehicle 100, which in the present disclosure at least includes a perception system 104. Certain other sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system may further refer to signals provided from the machine control system.

Various examples of perception system 104 components for providing signals representative of perception inputs 120 (e.g., debris) are conventionally known and may include imaging devices (e.g., cameras), laser scanners, two dimensional/three dimensional laser detection and ranging (LIDAR) system sensors, thermal sensors, structured light sensors, ultrasonic sensors, and other optical sensors. The types and combinations of perception system sensors may vary for a type of working machine, work area, and/or application, but generally are provided and configured to optimize recognition of relevant (actual and/or potential) contaminants with respect to the cooling system 150 of the work vehicle 100.

The controller 112 in an embodiment (not shown) may include or may be associated with a processor, a computer readable medium, a communication unit, data storage such as for example a database network, and the aforementioned user interface 114 or control panel 114 having a display. An input/output device, such as a keyboard, joystick or other user interface tool, may be provided so that the human operator may input instructions to the controller. It is understood that the controller described herein may be a single controller having all of the described functionality, or it may include multiple controllers wherein the described functionality is distributed among the multiple controllers.

Various operations, steps or algorithms as described in connection with the controller 112 can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit may support or provide communications between the controller 112 and external systems or devices, and/or support or provide communication interface with respect to internal components of the work vehicle 100. The communications unit may include wireless communication system components (e.g., via cellular modem, WiFi, Bluetooth or the like) and/or may include one or more wired communications terminals such as universal serial bus ports.

Data storage as discussed herein may, unless otherwise stated, generally encompass hardware such as volatile or non-volatile storage devices, drives, memory, or other storage media, as well as one or more databases residing thereon. In an embodiment, work area locations may be retrievably stored with respect to the controller 112, wherein at least an initial work area type may be determined at the beginning of a work vehicle operation through the use of GPS data, as associated with a defined work area type at the determined location. In additional or alternative variants on this embodiment, sets of target data can be retrievably stored in bulk form, wherein an operator selection of, e.g., a work area using the user interface 114 can enable retrieval by the controller of an array of parameters or initial bounds for the algorithms as disclosed herein.

Referring further now to FIG. 3, a method of operation 300 of the work vehicle 100 and more particularly with respect to a perception system 104 and controller 112 therein may now be described.

An embodiment of the method 300 may begin (step 301) with initiation of work vehicle operation. In an example that will be referred to herein, a four-wheel drive loader is operated in a facility that processes lumber into a number of final products. However, this example is for illustrative purposes and it will be understood by one of skill in the art that various alternative types of work vehicles 100, in alternative types of work areas and under various alternative types of conditions, would fall within the scope of the present method and equivalents thereof. Further, it should also be understood that various subsequent steps may still be performed even when the work vehicle is not operating for its typically intended purpose, and indeed that the enumerated steps herein may be performed in a different order or even omitted entirely in certain contexts.

The illustrative method 300 continues by obtaining perception data from an onboard perception system 104 (step 302). As previously noted, the perception system 104 may take any of various forms (e.g., camera arrays, 3D laser scanners, passive infrared sensors) and may generally be mounted to the rear of the vehicle 100, for example to provide a field of view including the inlet 152 to the cooling system 150. In various embodiments, it is not necessary that a field of view "including the inlet" actually provide images of the inlet itself, as for example a sensor/scanner located on the same left side of the work vehicle yet be configured to capture perception data for effectively all actual or potential contaminants to enter the inlet without observing the inlet itself. The various perception inputs 120 are captured by the perception system 104, which may process the inputs to generate perception data representative of the contaminants to the controller 112, or otherwise send the raw inputs directly to the controller as the perception data for processing thereon.

The illustrative method 300 continues by automatically determining characteristics of the environment, otherwise associated with the contamination (step 304). As part of this processing step, the controller 112 may receive, or otherwise ascertain, and further implement a number of parameters or variables (step 303) influencing the characteristics, depending for example on the type of characteristic being analyzed. In an embodiment, the perception data may be transmitted to a remote server or equivalent computing device for performance, of one or more steps, including the determining of characteristics.

In another embodiment, the controller 112 may be implemented with a simplified set of parameters and control logic for implementation of the method steps in a current work vehicle application, whereas a remote server network is implemented for development of machine learning algorithms or neural networks for ascertaining and/or inferring patterns in cooling system contamination based on previously identified perception inputs 120, machine operating parameters, ambient conditions, combinations thereof, etc. The controller may utilize communications with the remote server for confirmation of local analysis prior to taking subsequent steps in cooling fan 164 control, or may be configured to only communicate with the remote server at the beginning of a work project for receiving target values, algorithm bounds, weights, etc., and/or at the end of a work project for transmitting data collected during the work project, etc.

Exemplary such variables and/or parameters may include vehicle drive parameters 303A, an ambient temperature 303B (internal and/or external to the work vehicle), a type of work area 303C, and the like. The vehicle drive parameters 303A may include any number of relevant inputs and/or outputs that can be detected or otherwise provided to the controller 112 for real-time processing or machine learning, including without limitation an engine load, hydraulic displacements, power demands, machine control (i.e., target) setting advance speed. As further noted below, one or more such inputs and/or outputs may be captured and analyzed using, e.g., a rain flow cycle counting method to determine or assist in determining the amount of debris 120 that has been ingested into the cooling system 150 based on changes in machine performance.

Generally speaking, machine learning algorithms may be provided for identifying and classifying debris 120 that is located near the inlet 152 to the cooling system 150, either in the air or on the ground. In this context, exemplary characteristics may include a location of the debris, a type of debris, a debris density, size, and/or quantity, etc., values for army one or more of which may be provided as inputs for cooling fan speed, timing, and reversal logic.

In an embodiment, the determination of some or all characteristics associated with cooling system contamination may require manual confirmation, via for example tools provided with the user interface 114. Alternatively, manual confirmation may only be required during an initial setup mode before machine operation, or for example only before generating output signals to the cooling system 150 for dynamically altering the cooling fan speed, direction, etc.

The illustrative method 300 continues by determining whether or not cooling fan 164 adjustment is required (step 306), based for example on the determined characteristics and optionally by comparison to relevant predetermined threshold values (305). Where applicable, such threshold values may be provided by an operator or other authorized user of the system, or the threshold values may be dynamically generated by the controller 112 or remote computing device in conjunction with the controller to account for a type of vehicle, capacity of cooling system, type of work area, ambient conditions, etc.

In one context the controller 112 may be configured to identify a particular type of work area, wherein the potential for contamination in a short period of time is relatively small, or for example the expected variance in contamination is relatively small, and the predetermined threshold for cooling fan reversal may be maintained. However, in another context, or even when the context changes within the same general work area, for example in view of changing ambient conditions or a change in orientation of the work vehicle 100, the controller may identify an increased expectation of contamination. Subsequently, the controller may dynamically modify a predetermined threshold to arrive at a new target setting, wherein the cooling fan 164 is reversed prior to a predicted point of excessive contamination or risk thereof.

If no change is deemed prudent or necessary based on the determination (i.e., "no" in response to the query in step 306), the method 300 returns to step 302 and continues obtaining and processing perception data via the perception system 104.

If a change is deemed prudent or necessary (i.e., "yes" response to the query in step 306), the method 300 may continue by generating output signals to the cooling system 150 (step 307), and more particularly to an actuator or local control unit for the cooling fan 164. In an embodiment (not shown), the system algorithm may determine or predict a point at which manual cleanout by the operator is or would be required, wherein control signals are instead generated to an onboard user interface 114 and/or separate user interface.

In the illustrated embodiment (step 308), the control signals may be generated to the cooling system 150 to provide one or more commands or settings.

For example, the controller 112 may specify a maximum operating speed (step 308A) for the cooling fan 164 under a determined or predicted work environment. For example, in work environments where a work vehicle 100 only periodically encounters debris 120 that is easily ingested into a cooling system 150, the cooling fan logic could reduce the maximum fan speed in that area to keep from obstructing the heat exchangers.

Using the previous example of a 4WD loader 100B in a lumber processing facility, when the work vehicle is positioned such that the cooling system inlet 152 is oriented toward raw trees, the camera 104 detects the work environment to be trees and the controller 112 may allow the cooling fan speed to operate as required to cool the machine appropriately. When the work vehicle is otherwise positioned such that the cooling system inlet 152 is oriented toward mulch, wood chips, or sawdust, the vehicle controller 112 may limit the maximum speeds of the cooling fans 164 to control the ingestion of that material into the cooling system 150.

As another example (step 308B), the controller 112 may directly specify the cooling fan direction at a given time. If the cooling fan 164 is currently operating in a first (e.g., forward) direction, and a determined ingestion of the cooling system has reached a threshold value, the controller 112 may direct the cooling fan to operate in a second (e.g., reverse) direction wherein the contaminant is ideally blown out of the cooling system 150 (i.e., out of the coolers).

In an embodiment, this step may also reflect the step taken when the controller 112 determines that no change is to be made (i.e., "no" in response to the query of step 306), wherein the cooling fan 164 is already for example operating in a first direction, and the controller 112 determines that the first direction is still appropriate under the circumstances.

The controller 112 may (step 308C) specify a frequency of cooling fan reversal, which in other words would take the form of a dynamically set frequency of reversal based on data-driven analysis, rather than setting of a predetermined frequency.

In yet another example, the controller 112 may (step 308D) specify a duration of a time period in between cooling fan reversals, which as in the previous step would take the form of a dynamically set duration based on data-driven analysis, rather than setting of a predetermined duration.

In at least the two preceding steps (308C, 308D), alteration of the fan reversal logic may provide for more frequent reversals to cleanout the coolers of the system 150, or to prolong the time period in between fan reversals, in order to improve the durability of the system.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A self-propelled work vehicle comprising:
   a main frame supported by a plurality of ground engaging units;
   a cooling system supported by the main frame and configured to direct ambient air in accordance with at least one inlet in the main frame, the cooling system comprising at least one cooling fan configured to operate in a first direction and an opposing second direction;
   a perception system supported by the main frame and configured to provide perception data corresponding to a field of vision which includes one or more of the at least one inlet and at least a portion of an associated working area;
   a controller communicatively linked to the perception system and the cooling system, and configured to
      automatically determine one or more characteristics relating to contamination of the cooling system, based at least on the provided perception data, and
      generate output signals to one or more of the at least one cooling fan based on at least one of the determined one or more contaminant characteristics.

2. The self-propelled work vehicle of claim 1, wherein:
   the controller is configured to identify debris in the working area from the provided perception data, and to automatically determine the one or more characteristics relating to contamination of the cooling system based at least on classification of the identified debris.

3. The self-propelled work vehicle of claim 2, wherein:
   the one or more characteristics relating to contamination of the cooling system comprise one or more of: debris location; debris type; and debris density.

4. The self-propelled work vehicle of claim 2, wherein:
   the controller is further configured to determine a type of working area from the provided perception data, and to classify the identified debris based at least in part on the type of working area.

5. The self-propelled work vehicle of claim 2, wherein:
   the controller is further configured to determine a type of working area from the provided perception data, and to identify the debris in the working area based at least in part on the type of working area.

6. The self-propelled work vehicle of claim 2, wherein:
   the controller is configured to generate the output signals based on a comparison of the at least one of the determined one or more contaminant characteristics to an associated contaminant threshold.

7. The self-propelled work vehicle of claim 6, wherein:
   the controller is configured to predict an ingested amount of debris as a contaminant characteristic.

8. The self-propelled work vehicle of claim 6, wherein:
   the controller is configured to obtain one or more vehicle drive parameters, and to implement based at least in part thereon a rainwater cycle counting algorithm to determine an ingested amount of debris as a contaminant characteristic.

9. The self-propelled work vehicle of claim 8, wherein:
   the controller is configured to obtain an ambient temperature, and to further implement the ambient temperature in the rainwater cycle counting algorithm to determine an ingested amount of debris as a contaminant characteristic.

10. The self-propelled work vehicle of claim 1, wherein:
    the one or more output signals are generated to dynamically modify a maximum operating speed for the one or more of the at least one cooling fan based on at least one of the determined one or more contaminant characteristics.

11. The self-propelled work vehicle of claim 1, wherein:
    the one or more output signals are generated to dynamically modify a fan direction for the one or more of the at least one cooling fan based on at least one of the determined one or more contaminant characteristics.

12. The self-propelled work vehicle of claim 1, further comprising:
    the one or more output signals are generated to dynamically modify a frequency of fan direction reversal for the one or more of the at least one cooling fan based on at least one of the determined one or more contaminant characteristics.

13. The self-propelled work vehicle of claim 1, further comprising:
    the one or more output signals are generated to dynamically modify a duration of fan direction reversal for the one or more of the at least one cooling fan based on at least one of the determined one or more contaminant characteristics.

14. The self-propelled work vehicle of claim 1, wherein:
    the controller is further configured to
       automatically determine that at least one of the one or more characteristics relating to contamination of the cooling system exceed a removal capability of the cooling system, and
       generate output signals to a user interface for alerting or scheduling manual intervention with respect to the cooling system.

15. A method of controlling at least one cooling fan to direct ambient air in accordance with at least one inlet in a main frame of a self-propelled work vehicle, each of the at least one cooling fan operable in a first direction and an opposing second direction, the method comprising:
    obtaining perception data from a perception system supported by the main frame, the perception data corresponding to a field of vision which includes one or more of the at least one inlet and at least a portion of an associated working area;

automatically determining one or more characteristics relating to contamination of the cooling system, based at least on the provided perception data; and generating output signals to one or more of the at least one cooling fan based on at least one of the determined one or more contaminant characteristics.

16. The method of claim 15, wherein the step of automatically determining one or more characteristics relating to contamination of the cooling system comprises:

identifying debris in the working area from the provided perception data, and automatically determining the one or more characteristics relating to contamination of the cooling system based at least on classification of the identified debris, wherein the one or more characteristics relating to contamination of the cooling system comprise one or more of: debris location; debris type; and debris density.

17. The method of claim 16, further comprising:

determining a type of working area from the provided perception data, and based at least in part on the determined type of working area, one or more of:

identifying the debris in the working area; and classifying the identified debris.

18. The method of claim 16, wherein:

the output signals are generated based on a comparison of the at least one of the determined one or more contaminant characteristics to an associated contaminant threshold.

19. The method of claim 18, further comprising:

obtaining one or more vehicle drive parameters and/or an ambient temperature value;

implementing, based at least in part thereon, a rainwater cycle counting algorithm to determine an ingested amount of debris as a contaminant characteristic.

20. The method of claim 15, wherein the one or more output signals are generated to dynamically modify one or more of:

a maximum operating speed for the one or more of the at least one cooling fan based on at least one of the determined one or more contaminant characteristics;

a fan direction for the one or more of the at least one cooling fan based on at least one of the determined one or more contaminant characteristics;

a frequency of fan direction reversal for the one or more of the at least one cooling fan based on at least one of the determined one or more contaminant characteristics; and a duration of fan direction reversal for the one or more of the at least one cooling fan based on at least one of the determined one or more contaminant characteristics.

* * * * *

UNITED STATES PATENT AND TRADEMARK OFFICE
CERTIFICATE OF CORRECTION

| | | |
|---|---|---|
| PATENT NO. | : 11,555,291 B2 | |
| APPLICATION NO. | : 16/841191 | |
| DATED | : January 17, 2023 | |
| INVENTOR(S) | : Thomas Kennedy and Craig Conrad | |

It is certified that error appears in the above-identified patent and that said Letters Patent is hereby corrected as shown below:

On the Title Page

Abstract, Line 12:
The "o" in the word "on" should not be capitalized

In the Specification

Column 5, Line 56:
Replace the word "terns" with the word -- terms --

Signed and Sealed this
Twenty-first Day of March, 2023

Katherine Kelly Vidal
*Director of the United States Patent and Trademark Office*